United States Patent [19]

Hayashi et al.

[11] Patent Number: 5,131,952
[45] Date of Patent: Jul. 21, 1992

[54] ELECTRICALLY CONDUCTIVE ZINC SULFIDE POWDER AND PROCESS OF PRODUCING THE SAME AND USE THEREOF

[75] Inventors: Takao Hayashi; Norihiro Sato, both of Shimonoseki; Manabu Hosoi, Omiya; Nobuyoshi Kasahara, Sayama, all of Japan; Clemens Aderhold, Krefeld, Fed. Rep. of Germany; Wolf-Dieter Griebler, Moers, Fed. Rep. of Germany; Jörg Hocken, Düsseldorf, Fed. Rep. of Germany; Uwe Rosin, Duisburg, Fed. Rep. of Germany; Günther Rudolph, Neuberg, Fed. Rep. of Germany

[73] Assignees: Metallgesellschaft Aktiengesellschaft, Frankfurt am Main, Fed. Rep. of Germany; Mitsui Mining & Smelting Co., Ltd., Tokyo, Japan

[21] Appl. No.: 566,180

[22] Filed: Aug. 10, 1990

[30] Foreign Application Priority Data

Sep. 1, 1989 [DE] Fed. Rep. of Germany ....... 3929056

[51] Int. Cl.$^5$ .................................................. C04B 14/36
[52] U.S. Cl. ..................................... 106/420; 252/518
[58] Field of Search .......................... 252/518; 428/403; 106/420

[56] References Cited

U.S. PATENT DOCUMENTS

| 4,086,123 | 4/1978 | Hummel et al. | 106/420 |
| 4,216,023 | 8/1980 | Kinstle | 106/420 |
| 4,681,807 | 7/1987 | Schulze et al. | 428/403 |
| 4,826,727 | 5/1989 | Glaser | 428/403 |

Primary Examiner—William R. Dixon, Jr.
Assistant Examiner—Chris Gallo
Attorney, Agent, or Firm—Felfe & Lynch

[57] ABSTRACT

An electrically conductive powder is provided which comprises particles of zinc sulfide coated with an electrically conductive coating of copper sulfide wherein the zinc sulfide particles have a BET surface area of 2 to 10 m$^2$/g and a purity of at least 97%, and is particularly useful to impart antistatic properties to plastics, synthetic fibers, laminated papers and the like.

9 Claims, 2 Drawing Sheets

1 NH$_3$ oq
2 H$_2$SO$_4$
3 POWER MIXTURE
4 EDTA

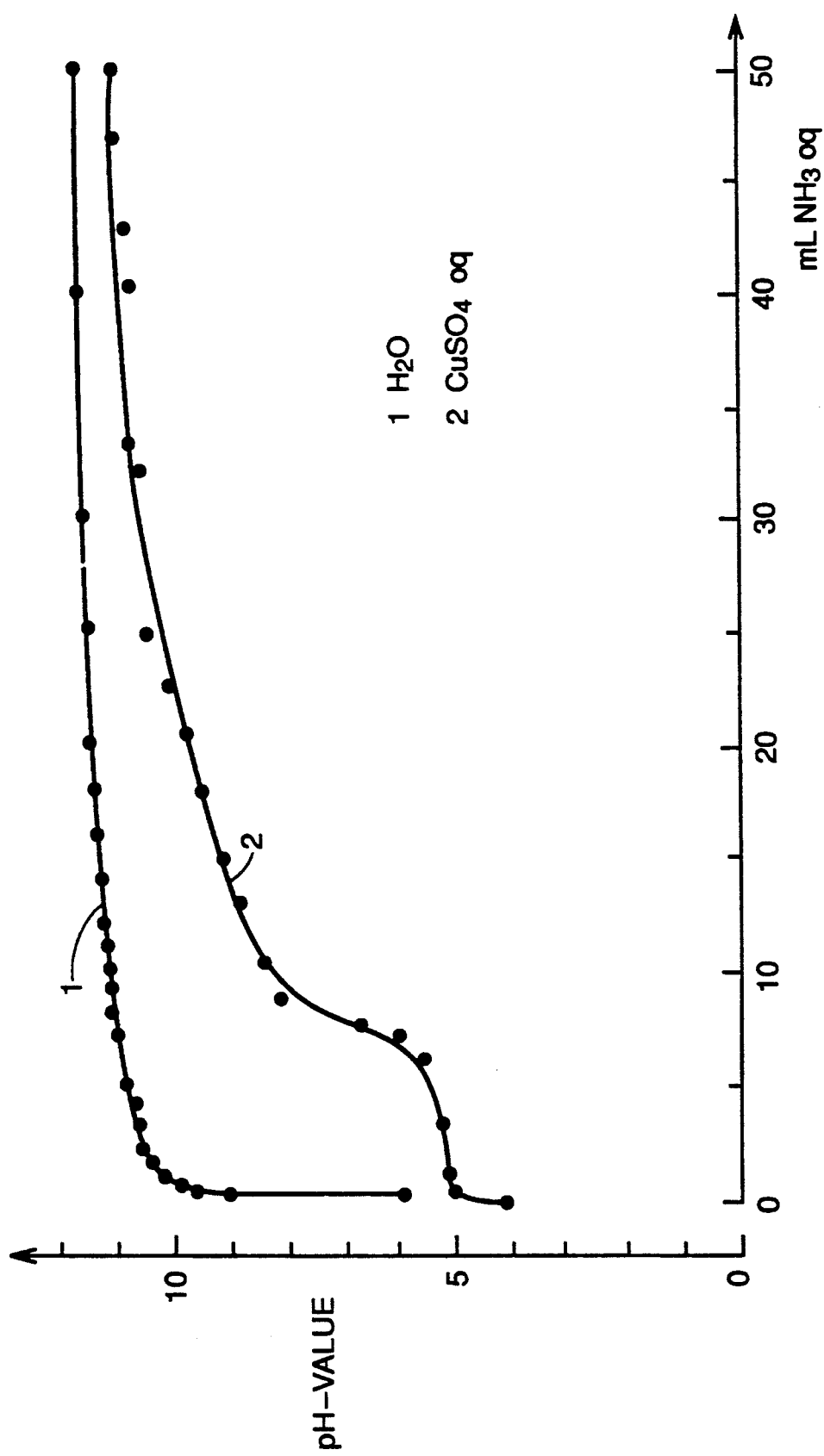

ELECTRICALLY CONDUCTIVE ZINC SULFIDE POWDER AND PROCESS OF PRODUCING THE SAME AND USE THEREOF

FIELD OF THE INVENTION

This invention relates to electrically conductive zinc sulfide powder and to a process of producing the same.

BACKGROUND OF THE INVENTION

Although plastics are known to have electrical insulating properties such materials are increasingly required to have a certain electrical conductivity for special applications. In addition to the shielding of electronic components from external electromagnetic fields, (e.g., in the case of computer housings), such applications particularly concern cases in which static electricity is to be discharged, e.g., in the packaging industry, for instance, in the storage of explosives.

Additional applications include integrated circuit components, etc., medical rubber articles having antistatic properties, wall-to-wall carpets having electrostatic properties, antistatic "clean rooms", and electrically conductive metal-joining adhesives. Plastic components which are electrically conductive or provided with an electrically conductive surface film may be provided with an electrostatic paint.

It is known to render polymers electrically conductive by an addition of conductive particles. For instance, metal or carbon black particles, semiconducting oxides, such as zinc oxide, or iodides, such as copper iodide, may be used.

As a rule, polymers containing a commercially available additive as a filler have a black color because the, contain carbon black or metal particles. But a black color is not desired in many cases. Polymers containing, e.g., zinc oxide, as a filler are not stable with respect to their electrical conductivity, and polymers containing, e.g., copper iodide, as a filler are not sufficiently inert. Titanium oxide doped with antimony may be unacceptable toxicologically. From European Patent specification 025 583 it is known to coat titanium oxide particles with a layer consisting of antimony-doped tin oxide. The previously known electrically conductive white powder may be transformed into an electrically conductive color pigment by an addition of dyestuffs or pigments.

The electrical conductivity of copper has also been known for a long time but its fairly high price has opposed its wide use as an antistatic additive. Further, pure copper sulfide is almost black so that the material is very close phenomenologically to much less expensive conductivity-imparting carbon blacks, which are also black.

It is, therefore, an object of the present invention to provide an electrically conductive powder which combines a stable electrical conductivity with a high dispersibility in polymers and resins and which can be produced in a simple and economical manner.

SUMMARY OF THE INVENTION

In accordance with the present invention there is provided, a conductive powder consisting of inorganic substrate particles which have an electrically conductive coating. The electrically conductive powder comprises particles of zinc sulfide coated with a layer of copper sulfide.

BRIEF DESCRIPTION OF THE DRAWINGS

FIG. 2 further represents the present invention, particularly the effect of pH values.

DETAILED DESCRIPTION OF THE INVENTION

Figure 1:
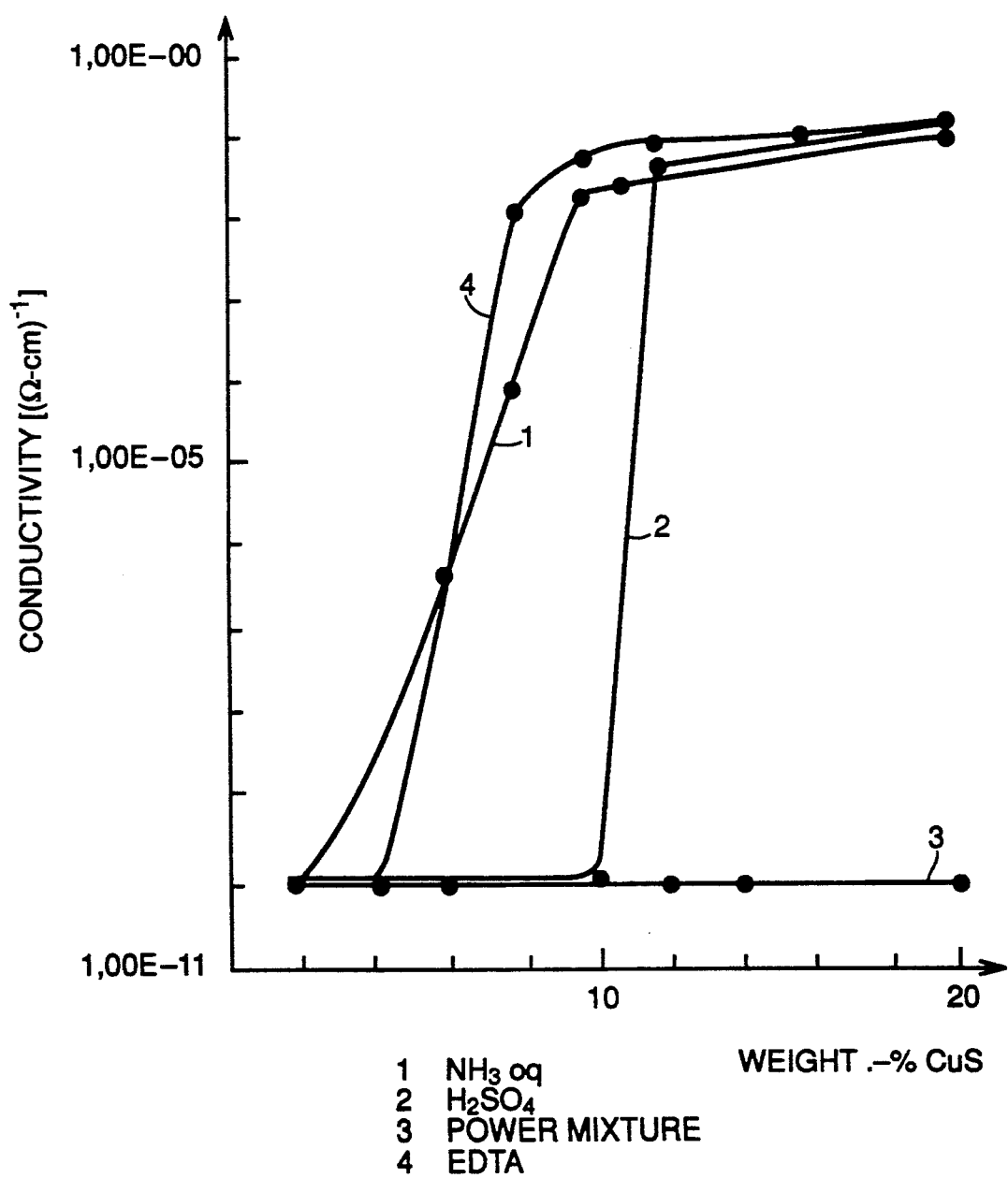
FIG. 1 graphically represents the present invention, particularly conductivity as a function of CuS concentration percent by weight.

The electrically conductive powder in accordance with the invention consists in a major part by weight of relatively inexpensive zinc sulfide, which, particularly in pigment grade, combines a small particle size range with a very high dispersibility. The zinc sulfide core also brightens the almost black color of copper sulfide to an intermediate green. The proportion by weight of the copper sulfide in the electrically conductive powder usually amounts to 2% to 30% by weight and a proportion of 6% to 18% by weight is a preferred range.

The zinc sulfide used as a substrate or core suitably is of a high purity of at least 97%. Products of such purity are generally processed to a pigment grade. As a result, pigment-grade ZnS products such as are preferred for the purposes of this invention have a BET surface area of 1 to 20 $m^2/g$, and preferably of 2 to 10 $m^2/g$.

The copper sulfide coating produces various desirable results. As the proportion of copper sulfide preferably amounts to only 6 to 18% by weight, it contributes considerably to the reduction of raw material costs, and the entire product has the same electrical properties as pure copper sulfide. Further, because the copper sulfide layer has a comparatively small thickness generally amounting to 1 to 5 nm on zinc sulfide, the coated product is distinctly brighter than pure copper sulfide (e.g., brightness reference value: copper sulfide 2.0; zinc sulfide coated with 14% copper sulfide: 19.8). Favorable properties of pigment-grade zinc sulfide, such as small particle size range, high dispersibility, and low abrasiveness, are preserved, provided that the copper sulfide layer on the zinc sulfide core has an adequate strength, especially during processing, such as grinding, dispersing, etc., which pigment typically undergo.

The excellent bonding observed of copper sulfide on a zinc sulfide substrate may be explained from that aspect of crystal chemistry. Whereas copper sulfide and zinc sulfide differ in crystal structure, the complicated laminar structure of copper sulfide contains individual planes which are at right angles to the hexagon c-axis and are an optimum geometrical match to the zinc blende and wurtzite types of zinc sulfide; ever the respective metal ion to sulfide ion distances are identical. This furnishes an explanation of the excellent homogeneity of the coatings obtained, which has been confirmed by REM and TEM examinations. This explains why the X-ray powder lines of the copper sulfide even when it is applied in thin layers coincide in position and in intensity with those of the pure substance in spite of an assumed epitaxy on the molecular level.

Reference is made in that connection to the graph of FIG. 1, which illustrates the dependence of the electrical conductivity of three zinc sulfide powders coated with copper sulfide and wherein copper sulfide content is expressed in % by weight. The copper sulfide coating was formed on the zinc sulfide in one case in an acid aqueous medium; in a second case with an equimolar addition of EDTA (ethylene diamine tetraacetate) at pH 7; and in a further case in an alkaline aqueous medium. For comparison, the electrical conductivities of mixed copper sulfide and zinc sulfide powders are also indicated.

The electrical conductivities of the resulting powders have been determined by a measurement of the volume resistance of small plates having a thickness of 1 to 5 mm. For that purpose the powders were compacted to form small plates under a pressure of 90 bars and the measurement was conducted with electrodes applied under a pressure of 2 to 5 bars.

The base substrate of the powders used for preparing the graph is a pigment grade zinc sulfide ($d_{50}$ (Sedigraph) 0.37 μm; surface area 8 m$^2$/g)). It is apparent from the graph that the electrical conductivity will be low in both cases if the copper sulfide content is low and will rise suddenly in the range of 4 to 12% by weight CuS. If the coating is assumed to be homogeneous, a thickness of about 3 nm of the layer can be calculated from the above figures. If an oriented growth at right angles to the crystallographic c axis of copper sulfide is assumed, as stated above, this means that a layer having a thickness of only two elementary cells (E (CuS): a=0.3792 nm; c=1.634 nm)) will be sufficient for achieving electrical conductivity.

In view of the minimum thickness which is required for the layer, the minimum percentage of copper sulfide which is required can approximately be estimated in dependence on the $D_{50}$ value of the zinc sulfide which is employed. If it is assumed that the particles of zinc sulfide (specific gravity about 4 g/cm$^3$) are spherical, the corresponding surface area can be calculated by relationship (1):

$$\text{surface area (m}^2/\text{g)} = 1.5/d_{50}(d_{50} \text{ (μm)}) \tag{1}$$

From the result, the content of copper sulfide (specific gravity 4.7 g/cm$^3$) for a layer having a thickness of 3 nm can approximately be calculated according to relationship (2):

$$\% \text{ CuS} = 2.26/d_{50}(d_{50} \text{ (μm)}) \tag{2}$$

The copper sulfide requirement, however, will be somewhat higher in commercial practice because the zinc sulfide particles are rarely perfectly spherical. Besides, the fines which are present will constitute an overproportional contribution to the surface area. On the other hand, the above-mentioned relationship will furnish unreasonable values if the $d_{50}$ values are very low (e.g., percentages in excess of 100 if $d_{50}<0.02$ μm) because some simplifying assumptions are no longer valid.

The present invention also provides a process for producing electrically conductive particles of zinc sulfide. The process relies on the different solubilities of zinc sulfide and copper sulfide (solubility products: $K_{sp}$ (ZnS=21.7; $K_{sp}$(CuS)=40.2)). The process of producing electrically conductive particles of zinc sulfide in accordance with the present invention comprises mixing an aqueous solution or suspension of a copper salt, having a pH value from 2 to 12, and zinc sulfide particles with vigorous stirring, and then separating the particles of zinc sulfide which have been provided with a coating of copper sulfide by a surface reaction and further processing the coated particles. In the process of the present invention the mixing of the zinc component and the copper component results in an ion exchange reaction at the surfaces of the zinc sulfide particles which causes zinc sulfide to enter into solution and copper ions to precipitate. The copper salt must be more readily soluble in the aqueous medium than the copper sulfide. Care must also be taken that the zinc ions which have entered the solution will not form a compound with any component of the reaction solution which would be poorly soluble or insoluble under the selected conditions because in that case the electrically conductive powder obtained after the liquid-solid separation would be contaminated with such undesired zinc compound. Further, the concentration of free copper ions must exceed the value of $2.8 \times 10^{-28}$ g/l (calculated from $K_{sp}$ (CuS) and $K_{sp}$ (ZmS)). There is generally no limit to the concentration of zinc sulfide if a homogeneous suspension can be prepared. On the other hand, the concentration of ZnS is generally in the range from 20 g/l and 300 g/l.

Copper(II) salts are desirably used as copper salts which are more readily soluble in the reaction medium than copper sulfide. Particularly suitable copper salts are copper(II) salts of mineral acids, e.g., their nitrates, chlorides and sulfates. Copper(II) sulfate is preferred.

The aqueous solution generally contains the copper sulfate in an amount of up to 754 g/l CuSO$_4$·5 H$_2$O, preferably in an amount of 5 to 100 g/l CuSO$_4$·5 H$_2$O.

The desired thickness of the layer of copper sulfide on the zinc sulfide particles will approximately be determined by the amount of copper compound added, and by the surface area of the zinc sulfide which is employed.

In mixing the two components in the present inventive process it is generally not critical whether the zinc sulfide is introduced as such or as an aqueous suspension into the aqueous solution of the copper sulfate, or whether an aqueous solution of copper salt is introduced into a suspension of zinc sulfide. In either case, the suspension must be vigorously stirred and homogenized.

The temperature to be maintained in the present inventive process is between 10° and 110° C. Processing at an elevated temperature will considerably increase the reaction rate. In order to provide a uniform and firmly adhering coating, it is preferred to initially stir the reaction mixture at room temperature and to subsequently increase the temperature to 50° to 80° C. The reaction rate can also be increased by the addition of complexing agents, such as ammonium hydroxide or EDTA (ethylene diamine tetraacetate). Complexing agents can also prevent the precipitation of undesired products, such as zinc hydroxide or copper hydroxide, and thus will also improve the quality of the product.

The graph of FIG. 2 illustrates the response of solutions of copper sulfate to an increase of the pH value with ammonium hydroxide. The corresponding behavior of distilled water is illustrated in a control experiment. An increase of the pH value will initially result in the formation of a difficultly soluble precipitate consisting of basic copper sulfate (which reacts much more slowly to form copper sulfide). The addition of more ammonia will then result in the formation of the deeply blue copper tetrammine complex. The end point of the reaction between zinc sulfide and the copper(II) salt will be indicated by the disappearance of the blue color. In order to prevent precipitation of undesired secondary substances, such as hydroxides or hydroxide hydrates having different stoichiometries of ZnOCl$_2$ if CuCl$_2$ is used and of ZnSO$_4$·3 Zn(OH)$_2$·H$_2$O if CuSO$_4$ is used, the copper-containing solution is suitably introduced into the suspension of zinc sulfide and this is effected slowly and in such a manner that the concentration of dissolved copper ions is minimized. Alternatively, the reaction may be carried out in a acidic medium, preferably in a sulfuric acidic medium, although the reaction time will be much longer in that case.

In order to prevent dissolution of the zinc sulfide by bases or acids the reaction medium is adjusted to a pH value between 2 and 12.

Zinc sulfide of commercial grade, having a particle size from 0.05 to 5 μm, may be used as a substrate to be coated in the process in accordance with the invention, but pigment-grade zinc sulfide having a particle size from 0.2 to 0.6 μm and a surface area from 2 to 10 m$^2$/g is preferred. The use of smaller particles will result in a drastic increase of the quantity in which the copper sulfide layer is required and the higher costs will not result in an appreciable increase of the electrical conductivity. The use of larger particles of zinc sulfide will reduce the proportion of copper sulfide, and the application-technological properties will be adversely affected.

The electrically conductive zinc sulfide powder in accordance with the invention may be used to provide, e.g., paints, lacquers, varnishes and finishing and coating compositions comprising plastics, synthetic fibers, laminated papers and to make electrically conductive adhesive joints.

The present invention affords several significant advantages. In accordance with the present inventive process the electrically conductive zinc sulfide powder produced thereby has a high electrical conductivity and is highly dispersible in plastics, and can be produced in a simple and economical and reproducible manner. The elastomers and the thermoplastic and thermosetting polymers which contain the electrically conductive zinc sulfide powder in accordance with the invention may be provided with high antistatic properties.

The invention will be explained in more detail by way of the following Examples.

It is to be understood, however, that these examples are for illustrative purposes only and are not intended to limit the scope of the invention and claims in any way.

EXAMPLE 1

29.2 g $CuSO_4 \cdot 5 H_2O$ was dissolved in 600 ml $H_2O$ and the pH value adjusted to 9 with concentrated ammonia solution. 100 g ZnS powder ($d_{50}$[1]) 0.37 μm; BET surface area 6.8 m$^2$/g was then introduced with stirring within one minute. The resulting copper sulfide constitutes 11% of the product. The suspension was stirred at room temperature for 30 minutes and at 60° C. for another 85 minutes. The solids recovered after a solid-liquid separation were dried at 110° C. As a powder, the solids have an electrical conductivity of $1.9 \times 10^{-2}$ (ohm-cm)$^{-1}$. If ZnS powder is added to the Cu(II) solution, there will be virtually no S ions in the reaction solution. Any S ions which, in accordance with the solubility product of ZnS, will detach from the ZnS surface in contact with the reaction solution and will immediately precipitate as CuS almost at the ZnS surface. If a ZnS suspension is used, there will be some S ions in solution in accordance with the solubility product of ZnS. When the dissolved S ions have been precipitated as CuS, the conditions will be the same as with the use of ZnS power.

[1]In all Examples, a Type 5000D Sedigraph by Micrometrics was used for the particle size analysis.

EXAMPLE 2

16.8 g $CuSO_4 \cdot 5 H_2O$ was dissolved in 600 ml $H_2O$ and the pH value adjusted to 9 with concentrated ammonia solution. 100 g ZnS powder ($d_{50}$ 0.37 μm; BET surface area 6.8 m$^2$/g) was then introduced with stirring within one minute. The resulting CuS constitutes 6.5% by weight of the product. The suspension was stirred at room temperature for 30 minutes and at 60° C. for another 85 minutes. The product obtained after a solid-liquid separation was dried at 110° C. The measured electrical conductivity of the powder amounts to $4.7 \times 10^{-7}$ (ohm-cm)$^{-1}$.

EXAMPLE 3

65.8 g $CuSO_4 \cdot 5 H_2O$ was dissolved in 800 ml $H_2O$ and the pH value adjusted to 9 with concentrated ammonia solution. 100 g ZnS powder ($d_{50}$ 0.37 μm; BET surface area 6.8 m$^2$/g) was then introduced with stirring within one minute. The resulting copper sulfide constitutes 25% of the product. The suspension was stirred for 100 minutes at room temperature and thereafter at 60° C. for an additional 21 minutes. The product was separated, washed and then dried at 95° C. The powder has an electrical conductivity of $9.2 \times 10^{-2}$ (ohm-cm)$^{-1}$.

EXAMPLE 4

5.4 g $CuSO_4 \cdot 5 H_2O$ was dissolved in 600 ml $H_2O$ and the pH value adjusted to 9 with concentrated ammonia solution. 100 g ZnS powder ($d_{50}$: 0.37 μm BET surface area 6.8 m$^2$/g) was then introduced at room temperature with stirring. The suspension was stirred at room temperature for 30 minutes and at 60° C. for an additional 65 minutes. The solids were subsequently separated from the liquid, washed and air-dried at 110° C. With a CuS content of 2% by weight, a measurable electrical conductivity of the powder could not be determined ($<10^{-9}$ (ohm-cm)$^{-1}$.

EXAMPLE 5

11 g $CuSO_4 \cdot 5 H_2O$ was dissolved in 1000 ml $H_2O$ and the pH value adjusted to 3 with concentrated $H_2SO_4$. 100 g ZnS powder ($d_{50}$: 0.3 μm; BET surface area 8 m$^2$/g) was then introduced with stirring within one minute. The suspension was stirred at room temperature for 90 minutes and subsequently at 60° C. for 28 hours, and after filtration was washed and dried at 110° C. the resulting layer of copper sulfide constitutes 4% of the product. A measurable electrical conductivity of the powder could not be determined ($<10^{-9}$ (ohm-cm)$^{-1}$).

EXAMPLE 6

35.9 g $CuSO_4 \cdot 5 H_2O$ was dissolved in 1000 ml $H_2O$ and the pH value adjusted to 3 with concentrated $H_2SO_4$. 100 g ZnS powder ($d_{50}$: 0.3 μm; BET surface area 8 m$^2$/g) was introduced into the solution with stirring within one minute. The suspension was stirred at room temperature for 150 minutes and subsequently at 60° C. for 53 hours and at 80° C. for another 5 hours. After filtration, washing and drying (110° C.) the powder had an electrical conductivity of $3.0 \times 10^{-2}$ (ohm-cm)$^{-1}$. The resulting copper sulfide constituted 13.5% by weight of the product.

EXAMPLE 7

65.8 g $CuSO_4 \cdot 5 H_2O$ was dissolved in 1000 ml $H_2O$ and the pH value adjusted to 3 with concentrated $H_2SO_4$. 100 g ZnS powder ($d_{50}$: 0.3 μm; surface area 8 m$^2$/g) was then introduced with stirring within one minute. The suspension was stirred at room temperature for 150 minutes and subsequently at 60° C. for 67 hours and at 80° C. for an additional 7 hours. After a subsequent solid-liquid separation, followed by washing and drying (110° C.), the powder had an electrical/conductivity of $1.3 \times 10^{-1}$ (ohm-cm)$^{-1}$. The proportion of the copper sulfide coating in the zinc sulfide powder amounted to 25%.

EXAMPLE 8

5.4 g CuSO$_4$ was dissolved in 1500 ml H$_2$O and the pH value adjusted to 10 with concentrated ammonia solution. Thereafter, 100 g ZnS powder (d$_{50}$: 0.3 μm; BET surface area 8 m$^2$/g) was introduced with stirring within one minute. The suspension was stirred at room temperature for 30 minutes and at 60° C. for an additional 210 minutes. 30.5 g CuSO$_4$·5 H$_2$O dissolved in 250 ml H$_2$O was then slowly added in drops within said 210 minutes so that the concentration of dissolved copper in the suspension was always minimized. The final product contained 13.51 copper sulfide. As a powder, the washed and dried product had an electrical conductivity of $1.5 \times 10^{-1}$ (ohm-cm)$^{-1}$.

A precipitation of secondary substances, such as Cu(OH)$_x$ (SO$_4$)$_y$·z H$_2$O can be virtually inhibited by the addition of a complexing agent. The X-ray powder examination of that product revealed no diffraction peaks other than those of CuS and ZnS.

EXAMPLE 9

35.9 g CuSO$_4$·5 H$_2$O was dissolved in 750 ml H$_2$O and the pH value adjusted to 10 with concentrated ammonia. 100 g ZnS powder (surface area 75 m$^2$/g, primary particle size about 0.03 μm) was added with stirring within one minute. The suspension was stirred at room temperature for 17 hours. Thereafter the product recovered by filtration was washed and dried (110° C.). A measurable electrical conductivity of the powder could not be determined ($<10^{-2}$ (ohm-cm)$^{-1}$). The product contained 13.5% copper sulfide.

EXAMPLE 10

16.1 g CuSO$_4$·5 H$_2$O was dissolved in 300 ml H$_2$O. 50 g ZnS (d$_{50}$: 0.37 μm; BET surface area 6.8 m$^2$/g) was then introduced into the solution with stirring. The suspension was stirred at room temperature for 18 hours and subsequently at 70° C. until the blue color of the Cu-aquo complex had disappeared. The product was separated, washed and dried. The resulting powder had an electrical conductivity of $1.2 \times 10^{-1}$ (ohm-cm)$^{-1}$ and contained 12% copper sulfide.

Respective portions of 16.1 g CuSO$_4$·5 H$_2$O each were dissolved in 300 ml H$_2$O and the pH value adjusted to 9 with concentrated ammonia solution. In each case, 50 g ZnS powder (d$_{50}$: 0.37 μm; BET surface area: 6.8 m$^2$/g) was added with stirring within one minute. Suspension (a) was stirred at 40° C. for 16 hours; suspensions (b), (c) and (d) were stirred at room temperature for 16 hours and were subsequently stirred, respectively, at (b): 40° C., (c): 60° C. and (d): 80° C. until the copper tetrammine complex in each had been decolorized. Each product was separated, washed and dried at 110° C. The resulting powers had the following electrical conductivities:

a) $2.8 \times 10^{-1}$ (ohm-cm)$^{-1}$
b) $2.3 \times 10^{-2}$ (ohm-cm)$^{-1}$
c) $1.1 \times 10^{-2}$ (ohm-cm)$^{-1}$
d) $2.9 \times 10^{-2}$ (ohm-cm)$^{-1}$ The CuS content amounted to 12% in each case.

EXAMPLE 12

29 g CuSO$_4$·5 H$_2$O and 43.4 g of the sodium salt of ethylenediaminetetraacetic acid was dissolved in 1000 ml water and the pH value adjusted to 10 with concentrated sodium hydroxide solution. 111 g ZnS as a suspension (300 g/l) was then added at 60° C. within one minute. The resulting copper sulfide constitutes 10% of the product. The suspension was stirred at 60° C. for 5 hours until the reaction had been completed. The solids recovered by solid-liquid separation were dried at 110° C. and as a powder had an electrical conductivity of $4.7 \times 10^{-2}$ (ohm-cm)$^{-1}$.

It will be understood that the specification and examples are illustrative but not limitative of the present invention and that other embodiments within the spirit and scope of the invention will suggest themselves to those skilled in the art.

We claim:

1. An electrically conductive powder comprising particles of zinc sulfide which are coated with a layer of copper sulfide.

2. An electrically conductive powder according to claim 1, wherein the particles of zinc sulfide have a BET surface area (O) in accordance with the relationship O (m$^2$/g)$\geq$1.5 d, wherein d=d$_{50}$ of the ZnS employed in μm.

3. An electrically conductive powder according to claim 1 or 2, wherein the zinc sulfide particles have a BET surface area of 2 to 10 m$^2$/g.

4. An electrically conductive powder according to claim 3, wherein the particles of zinc sulfide have a purity of at least 97%.

5. An electrically conductive powder according to claim 4, wherein the particles of zinc sulfide have a crystal structure selected from the group consisting of wurtzite and zinc blend.

6. An electrically conductive powder according to claim 5, wherein the proportion of copper sulfide in % by weight in the powder meets the relationship % by weight CuS $\geq$2.3/d, wherein d=d$_{50}$ of the zinc sulfide employed in μm.

7. An electrically conductive powder according to claim 6, wherein the proportion of copper sulfide in the zinc sulfide powder is in an amount of from 2 to 30% by weight.

8. An electrically conductive powder according to claim 7, wherein the proportion of copper sulfide in the zinc sulfide powder is in an amount of from 6 to 18% by weight.

9. An electrically conductive powder according to claim 8, wherein the coating layer has a thickness of 1 to 5 nm.

* * * * *

UNITED STATES PATENT AND TRADEMARK OFFICE
CERTIFICATE OF CORRECTION

PATENT NO. : 5,131,952

DATED : July 21, 1992

INVENTOR(S) : Hayashi et al.

It is certified that error appears in the above-identified patent and that said Letters Patent is hereby corrected as shown below:

Col. 1, line 35
"they contain", not "the, contain"

Col. 2, line 51
"even the", not "ever the"

Col. 7, line 22
"13.5% copper", not "13. 51 copper".

Col. 8, line 4
"2.8 X $10^{-2}$", not "2.8 X $10^{-1}$"

Signed and Sealed this

Eighteenth Day of January, 1994

BRUCE LEHMAN

Attest:

Attesting Officer

Commissioner of Patents and Trademarks